United States Patent
Becker et al.

(10) Patent No.: US 6,184,661 B1
(45) Date of Patent: Feb. 6, 2001

(54) REGULATOR WITH ALTERNATOR OUTPUT CURRENT AND INPUT DRIVE POWER CONTROL

(75) Inventors: James Becker, Crystal Lake; Issam Jabaji, Morton Grove, both of IL (US)

(73) Assignee: C. E. Niehoff & Co., Evanston, IL (US)

( * ) Notice: Under 35 U.S.C. 154(b), the term of this patent shall be extended for 0 days.

(21) Appl. No.: 09/338,320

(22) Filed: Jun. 22, 1999

(51) Int. Cl.[7] ........................................ H02P 9/00
(52) U.S. Cl. ............................ 322/25; 322/27; 322/28; 322/29; 322/33
(58) Field of Search ........................... 322/17, 22, 23, 322/24, 25, 27, 28, 29, 32, 33, 34

(56) References Cited

U.S. PATENT DOCUMENTS

| | | | |
|---|---|---|---|
| 4,379,990 | 4/1983 | Sievers et al. | 322/99 |
| 4,419,619 | 12/1983 | Jindrick et al. | 323/257 |
| 4,584,515 * | 4/1986 | Edwards | 322/28 |
| 4,634,954 | 1/1987 | Kato et al. | 322/28 |
| 4,636,706 | 1/1987 | Bowman et al. | 322/28 |
| 4,651,081 | 3/1987 | Nishimura et al. | 320/64 |
| 4,659,977 | 4/1987 | Kissel et al. | 320/64 |
| 4,670,705 | 6/1987 | Sievers et al. | 322/28 |
| 4,682,044 | 7/1987 | Hotate et al. | 290/40 B |
| 4,789,817 | 12/1988 | Asakura et al. | 322/28 |
| 4,992,951 | 2/1991 | Glowczewski et al. | 364/483 |
| 5,006,781 | 4/1991 | Schultz et al. | 322/25 |
| 5,023,539 | 6/1991 | Miller et al. | 322/28 |
| 5,168,208 | 12/1992 | Schultz et al. | 322/25 |
| 5,210,480 | 5/1993 | Iwatani et al. | 322/28 |
| 5,216,350 | 6/1993 | Judge et al. | 322/25 |
| 5,225,764 | 7/1993 | Falater | 322/28 |
| 5,254,935 | 10/1993 | Vercesi et al. | 322/29 |
| 5,256,959 * | 10/1993 | Nagano et al. | 322/25 |
| 5,260,641 | 11/1993 | Iwatani | 322/28 |
| 5,262,711 | 11/1993 | Mori et al. | 322/28 |
| 5,272,614 | 12/1993 | Brunk et al. | 363/21 |
| 5,280,231 * | 1/1994 | Kato et al. | 320/31 |
| 5,294,879 | 3/1994 | Freeman et al. | 322/23 |
| 5,300,876 | 4/1994 | Takagi | 322/58 |
| 5,390,068 | 2/1995 | Schultz et al. | 361/95 |
| 5,481,176 * | 1/1996 | DeBiasi et al. | 322/7 |
| 5,491,404 | 2/1996 | Settles et al. | 323/283 |
| 5,512,813 | 4/1996 | Uchinami | 322/28 |
| 5,521,485 | 5/1996 | Vogelsberger | 322/28 |

(List continued on next page.)

OTHER PUBLICATIONS

European Search Report.
SAE Tech Paper, Nov. 18, 1962, "Dual Voltage Alternators," James Becker, Mahmood Pourkermani and Eskandar Saraie, C.E. Niehoff & Co.

*Primary Examiner*—Nicholas Ponomarenko
(74) *Attorney, Agent, or Firm*—Brinks Hofer Gilson & Lione

(57) ABSTRACT

An alternator regulator controls both output voltage and output current, limits input drive power and torque, and maintains output power within a prescribed range while operating over a wide ambient temperature range and shaft speed range. Voltage, shaft speed, and temperature signals are monitored, and the results are processed to determine the output current and to control the output power without exceeding the programmed limits for output voltage, output current, temperature, output power, drive power, torque, and shaft speed. This provides a predictable output power characteristic for the alternator and it eliminates high input drive power and torque excursions that occur at low temperature and certain shaft speeds. If programmed limits are exceeded over a specified interval, and the alternator does not respond to the control changes imposed by the regulator, the regulator will turn off the alternator's field current, activate an alarm circuit, and set fault codes. The regulator is also capable of communicating with other control systems to provide status, specify needs, and respond to requests.

19 Claims, 4 Drawing Sheets

U.S. PATENT DOCUMENTS

| | | | |
|---|---|---|---|
| 5,559,704 | 9/1996 | Vanek et al. | 364/431.07 |
| 5,581,172 | 12/1996 | Iwatani et al. | 322/28 |
| 5,583,420 | 12/1996 | Rice et al. | 322/25 |
| 5,712,786 | 1/1998 | Ueda | 364/431.7 |
| 5,719,488 * | 2/1998 | Mashino et al. | 322/28 |
| 5,739,677 | 4/1998 | Tsutsui et al. | 322/25 |
| 5,907,233 | 5/1999 | Jabaji | 322/28 |
| 5,929,609 * | 7/1999 | Joy et al. | 322/25 |

* cited by examiner

REGULATOR WITH ALTERNATOR OUTPUT CURRENT AND INPUT DRIVE POWER CONTROL

CROSS REFERENCE TO APPENDIX MICROFICHE

This specification includes an appendix microfiche (one microfiche comprising 36 frames), which includes a listing of a computer program included in the preferred embodiment described below, and a schematic diagram useful in applying this listing. This Appendix includes copyrighted subject matter, and the assignee of the present invention retains all copyright rights, other than the right to reproduce the Appendix as a portion of the attached specification.

BACKGROUND

This invention relates to a voltage regulator suitable for use with an electrical generator such as an alternator, and in particular to a voltage regulator that provides improved control functions by determining and limiting alternator output current as well as output voltage.

A modern vehicle uses an alternator to power the vehicle's electrical system and to recharge a battery that provides standby electric power whenever the vehicle engine is not operating or when insufficient electric power is available from the alternator. The alternator includes a field winding, stator windings, and a rotating shaft that is driven through some arrangement by an engine. Rectifiers are used to convert the alternating current generated by the stator windings into direct current for battery charging. A voltage regulator senses the alternator output voltage and controls the field coil current to maintain a constant voltage according to the regulator's internal voltage reference as external electric loads are added and removed, within the limits of the alternator output power capacity. This is generally achieved by making current flow through the field winding whenever output voltage drops below the reference voltage, and stopping the flow of current through the field winding whenever the output voltage rises above the reference voltage.

The appropriate regulator reference voltage is determined by the battery charging voltage needed for the particular application, and the vehicle electrical system typically is designed to operate at this voltage. The reference voltage is often designed with temperature compensation because it is desirable for battery charging that the charging voltage decrease as battery temperature increases. Alternator output current is produced in the stator windings when the field winding is conducting current and the alternator shaft is turning. At constant voltage the alternator output current increases with shaft speed in a nonlinear relationship, and this output current raises the stator winding temperature. As stator temperature increases, the maximum alternator output current at constant voltage decreases. Automotive alternator output power rating is typically determined at an alternator shaft speed of 5000 revolutions per minute.

When a vehicle engine is operating at idle speed the alternator output power is typically below the rated alternator power. This often means that the alternator is incapable of supplying all of the electric power needs at engine idle speed, and the battery supplies the shortfall electric power. As the temperature of the engine compartment and of the alternator stator winding increases, the alternator maximum output power is further decreased. It is not generally known how quickly the battery is being discharged under such circumstances unless a current shunt is used to measure battery discharge current, or if other means are employed to measure the battery's state of charge.

A different situation occurs at arctic temperatures if preheat is used to start the engine and high electric loads are quickly applied when the alternator is still cold. The alternator output power under such circumstances can significantly exceed the maximum rated output power for a few minutes. The drive power to the alternator to meet the electrical demand may exceed either torque or drive limits for the drive mechanism between the engine and the alternator and cause drive failure. Alternator drives for high power alternators have little margin to exceed peak torque and peak drive limits that are typically based on room temperature data. Alternator output voltage, output current, and efficiency can be used to determine input power, while input power and shaft speed can be used to determine input torque. It is difficult to measure direct current without a shunt, a calibrated device that develops a voltage across its terminals proportional to the current flow through the shunt.

It is not apparent that anyone has addressed all of the above problems in an alternator or voltage regulator design. However, various systems have been proposed which touch upon some aspects of the above problems. For example, Ueda, U.S. Pat. No. 5,712,786, proposes an engine idle speed control method that employs, among other features, a map related to engine idle speed and alternator field duty cycle to determine alternator output current without using a shunt. The determination of alternator current is a feature in the overall control of an idle speed control valve to automatically regulate the idle speed of an internal combustion engine. Ueda does not measure the alternator shaft speed nor apply temperature compensation to measured data regarding alternator operation.

Vanek, et al, U.S. Pat. No. 5,559,704, proposes a method of computing alternator power based on measured values of alternator current and voltage for the purpose of determining efficiency and engine horsepower. Alternating current detectors and direct current shunts are used to measure current. The shaft speed is not considered in this governed engine speed locomotive application, and neither the ambient temperature nor the stator winding temperature are measured.

SUMMARY

A need presently exists for an improved voltage regulator that is capable of monitoring output current so that output needs are satisfied without imposing excessive stress on the input drive requirements. It is also desirable to monitor the alternator output power with respect to applied loads to be aware when excess loads are applied so that action can be taken either to prioritize loads or to increase alternator shaft speed. The system preferably provides this information over a wide range of alternator shaft speeds and ambient temperatures. It is desirable to communicate with other systems to share status information and to take action on request.

The preferred embodiment described below includes a micro-controller voltage regulator that monitors various input signals and processes the values represented by the signals to determine precisely where the alternator is operating within its performance envelope. Input signals include phase voltage from one of the alternating current phases, field energize signal, external energize signal, output voltage, and temperature signals from various sources. The external energize signal activates the regulator into operation. The RPM buffer circuit output signal is processed to determine the alternator shaft speed.

Next, temperature and output voltage are measured and the programmed reference voltage is compensated for temperature. The alternating current phase voltage continues to be monitored to provide alternator shaft speed. If the measured voltage is below the reference voltage, the regulator causes current to be conducted through the alternator field winding at a gradually increasing rate. This causes the alternator output current to be generated. If the alternator is operating within its performance envelope, the output current will cause the output voltage to rise until it exceeds that of the reference voltage. At this point the regulator switches off the field current. Meanwhile, the regulator also determines the maximum rated current capacity at the measured shaft speed and the field winding average current. Field winding average current data and shaft speed are used with algorithms to determine the alternator output current. From the values of output current and output voltage, the regulator determines the alternator output power. The input drive power is determined by dividing the output power by the efficiency of power conversion at the respective shaft speed. The drive torque is computed by dividing the input drive power by the shaft speed and multiplying by a coefficient.

The relationship between the average field winding current (e.g. duty cycle) and alternator output current at various shaft speeds is a complex, nonlinear function. For this reason parameters used to calculate output current have been empirically derived and programmed as a memory map. The efficiency of power conversion is also nonlinear, but it may be approximated as a sloped line or a single order variable with respect to shaft speed. These two relationships are defined by the alternator design, and the regulator is preferably programmed for the model alternator that is being controlled.

A second function of the regulator relates to the establishment of operating limits and comparing these limits to the operating conditions. Limits are imposed on output voltage, output current, output power, drive power, input torque, temperature, and shaft speed. These limits are established by either output or input conditions, and some limits may be changed by communication port input.

A third function of the regulator relates to control over output power in order to remain within operating limits as well as within programmed limits that may be less than operating limits. The regulator exercises control over the alternator by controlling the field current. If a performance demand causes a programmed limit to be exceeded, the regulator will reduce the average field current in order to remain within the programmed limit. This will cause the output voltage to fall below the regulated voltage, activate a fault code, and prompt communication to external systems of the reason for the fault code. When performance demands are reduced to within the alternator's programmed limits or capabilities, then the alternator returns to normal operation and the fault codes are reset.

The foregoing paragraphs have been provided merely by way of introduction, and are not intended to limit the scope of the following claims.

BRIEF DESCRIPTION OF THE DRAWINGS

The accompanying drawings constitute part of this specification and serve to explain further selected embodiments of this invention.

DESCRIPTION OF THE PREFERRED EMBODIMENTS

Figure 3:
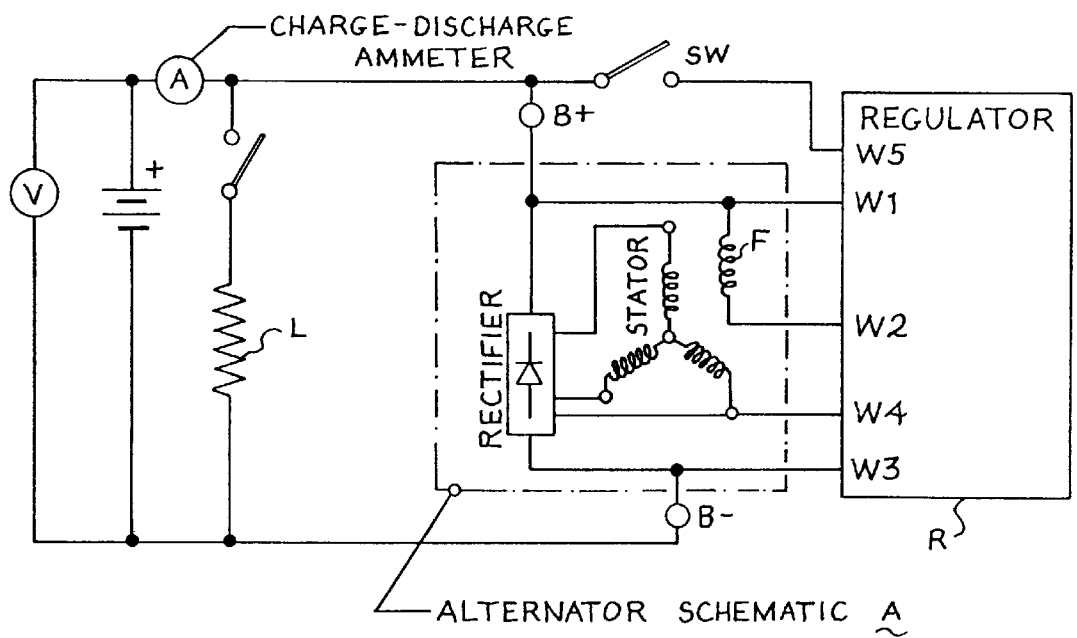
FIG. 3 is a schematic of a prior-art alternator and voltage regulator that are in common use on vehicles.

Turning now to the drawings, FIG. 3 shows a prior art alternator A, that supplies output power to a 14 volt electrical system that includes battery charging. In the conventional manner, the alternator A includes a field coil F and stator windings W. The stator windings are connected by rectifying diodes to the 14 volt direct current electric power bus. Conventionally, the alternator A is controlled by a voltage regulator R that controls the current through the field coil F to regulate the voltage on the 14 volt power bus as the electrical loads L are switched on and off. In one embodiment of this invention, the conventional voltage regulator R may be replaced by the regulator described herein.

Figure 1:
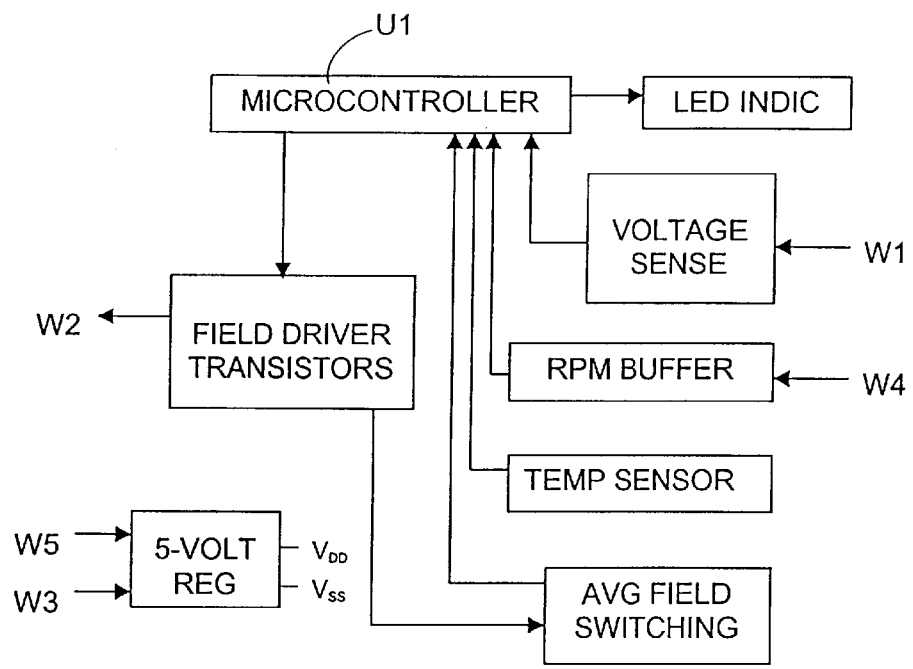
FIG. 1 is a block diagram of a regulator that incorporates a preferred embodiment of the present invention.

FIG. 1 provides a schematic diagram of a regulator that operates in accordance with this invention. The regulator includes a micro-controller U1 that executes a set of software routines at a rate determined by a clock signal generated by a clock. The micro-controller U1 includes a digital signal processor, an analog-to-digital converter, and suitable memories. A variety of micro-controllers may be used. For example, the micro-controller offered by Motorola as Part No. MC 68HC11 has been found suitable.

The regulator as depicted in FIG. 1 has been adapted for use with the alternator A shown in FIG. 3. The connector pins are designated W1 through W5. There are therefore five signals to the regulator, the same as for the conventional regulator depicted in FIG. 3. The function of these five signals is as follows:

W1 (Pos-in) represents the voltage of the 14 volt electric power bus as measured at this pin. It is the same signal as W5 (+14V-in). This signal is also called Voltage Sense.

W2 (Field-neg) represents the switched side of the field winding that is controlled by the regulator to enable the alternator to produce power when current is being conducted through the field winding. The signal which causes the field winding to conduct current is called Field Switching, and the signal which monitors this pin to determine the average field current is called Field Sense.

W3 (Neg-in) represents the ground reference for all voltage measurements.

W4 (Phase-in) represents the alternating current sense signal that is provided by one of the alternator stator windings W before rectification. This signal is called AC Sense, and it comes alive whenever the field winding is energized and the alternator shaft is turning. The signal is processed in the RPM Buffer so that the signal frequency reliably indicates the alternator's shaft speed.

W5 (Eng-in) represents the energize signal which is operated to bring the regulator into operation and to initialize the micro-controller. It is also called the Energize Signal. This signal is typically derived from the battery and passes through a variety of control switches before it arrives at the designated regulator pin. In some applications alternator operation is self-energized and the Energize Signal is generated after the alternator shaft begins turning. In such cases this signal is internal to the alternator and regulator circuit, and no external signal is supplied.

Average Field Switching: this circuit produces a voltage proportional to the time within a period that the field coil is conducting current (e.g. duty cycle).

Temperature Sense: this is an analog voltage proportional to the ambient temperature as measured by a temperature sensor included for the sake of convenience within the regulator enclosure. Any appropriate temperature responsive device may be mounted remotely if wiring is provided for the temperature signal. Other embodiments of this invention include temperature sensors for other parameters, such as stator winding temperature, field coil temperature, and bearing temperature.

During normal operation, the electric power bus voltage appears as the Voltage Sense signal which is buffered by capacitors and resistors and a Zener diode to protect the regulator from high transient voltages. The reset input of the micro-controller U1 is responsive to the Energize Signal that is, in turn, responsive to the ignition switch controlled by an operator. The micro-controller generates a control signal for the switching device that controls the current flowing through the field winding F of FIG. 3.

Figure 2:
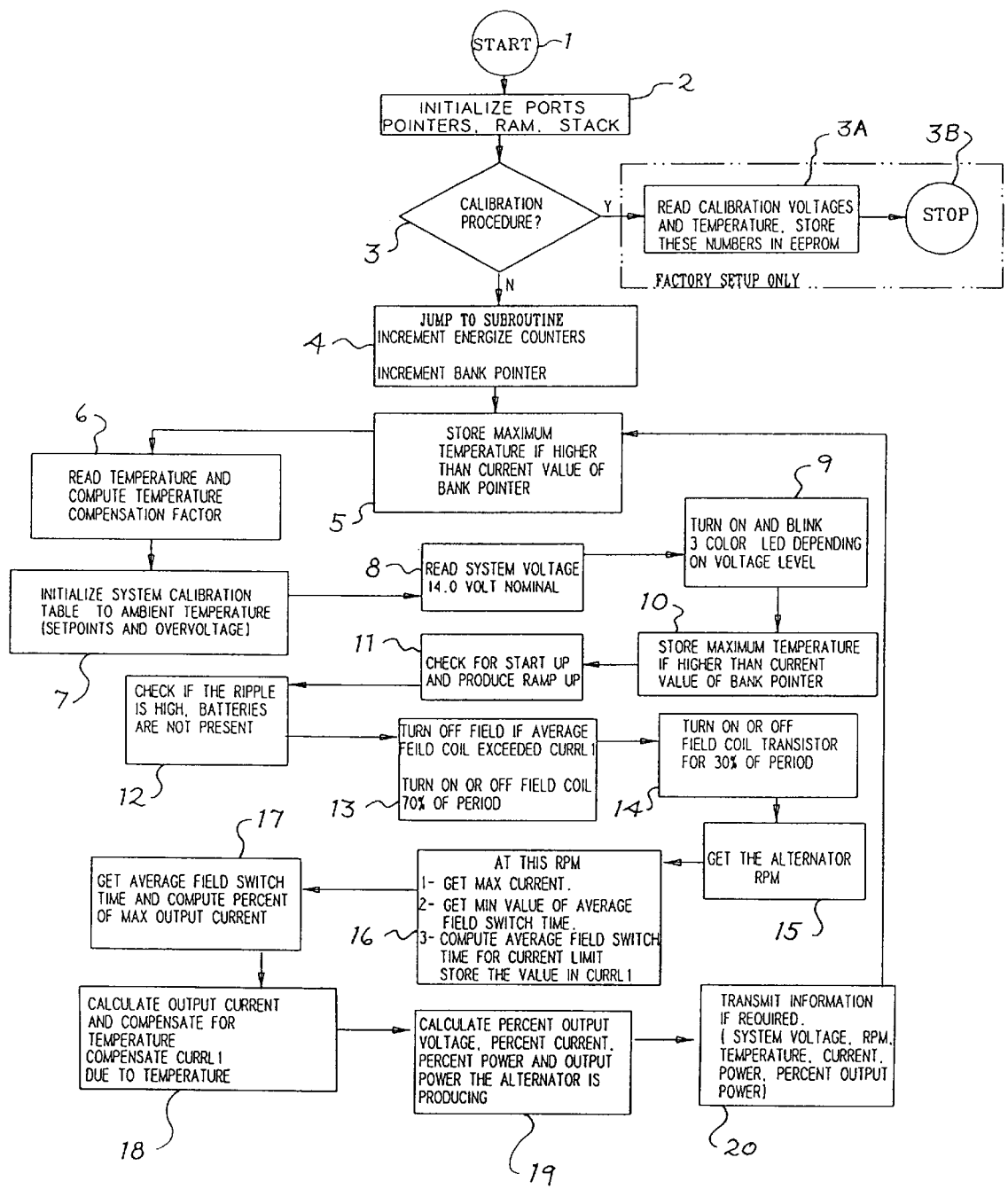
FIG. 2 is a flow chart of software routines executed by the micro-controller of FIG. 1.

FIG. 2 is a flow chart of the overall program software for the micro-controller U1. The normal operating sequence begins with the appearance of the Energize Signal at regulator pin W5 (represented by block 1), which leads to the initialization subroutine performed in block 2. A calibration decision point in block 3 is active only during a factory setup calibration procedure, so in normal operation blocks 3a and 3b are not executed and the routine proceeds to block 4. In this block, the energize counter maintains a count of the total number of times the regulator has been energized. The bank pointer addresses an internal memory of the micro-controller in block 5 that is used to store the maximum temperature measured by the regulator during the respective energizing.

In block 6, the temperature from the Temperature Sense circuit is read and a compensation factor is computed that is applied in block 7 as a temperature compensation to stored limits. Temperature compensation is applied to the regulated voltage. Another aspect of temperature compensation is to adjust for bias between the actual device temperature and the location at which the temperature transducer is located for those circumstances where direct measurement is not practical.

The Voltage Sense input that appears at regulator pin W1 is read in block 8 and compared to the programmed, temperature-compensated voltage regulation setting. A tri-color, diagnostic, light emitting diode mounted on the regulator receives a command from block 9 to blink green for satisfactory, red when operating at voltage higher than the regulated setting, and amber when operating at voltage below the regulated setting. The blinking feature confirms that the regulator is operating properly while the colors identify the voltage status. If the regulator has detected a fault that it cannot control, it will shut itself off, and cause a steady red light to appear. The Energize Signal must be cycled between OFF and ON to reset regulator operation if a shutoff occurs.

Block 10 updates the stored maximum temperature value if needed. Block 11 checks status to determine whether the alternator is in startup or in normal operation. The startup routine is designed to consume very little battery energy and hence imposes virtually no load to engine cranking requirements. It also minimizes drain on battery energy when the alternator drive is disconnected while the Energize signal is present. Block 12 checks if batteryless operation is taking place, because such operation benefits from additional compensation to the voltage regulation setting. Batteryless operation is determined either by sensing ripple voltage in the Voltage Sense signal that is above a programmed level, or by information supplied via the communication port.

Blocks 13 and 14 operate the field current switching transistor. The field current is switched ON, OFF, or ON for a fixed interval depending upon the result of two separate comparisons that are used for regulation purposes:
1. a comparison of the current output voltage as it relates to the voltage regulation setting;
2. a comparison of the current output current as it relates to the programmed current limit.

Block 15 determines the shaft speed by reading the AC sense signal that appears from the RPM Buffer circuit. The RPM Buffer circuit filters the signal from one of the stator windings and then measures the time interval between two rising voltages. The inverse of this time interval represents the signal frequency in cycles per second. In the particular alternator design of this embodiment the shaft speed of the alternator in revolutions per minute is equal to ten times the measured signal frequency.

In block 16, a memory map is read to determine two parameters: the maximum current that the alternator can produce at room temperature conditions, given the shaft speed measured in block 15, and a field threshold value (the average field switching time required to produce one amp of output current at the shaft speed measured in block 15). Generally speaking, the maximum current is that associated with a field current that is fully on throughout its measured period (i.e. a duty cycle of 100%). The field threshold value varies significantly with shaft speed and is used in this embodiment for accurate interpolation of alternator output current as a function of field winding duty cycle.

Block 17 reads the field sense signal within the sampling period. The field sense signal corresponds to the average field switching time during which the field winding is conducting current, and is proportional to the currently prevailing duty cycle of the field winding. The average field switching time less the field threshold value, divided by the full field value less the field threshold value represents the approximate ratio of the alternator output current with respect to the rated output at the measured shaft speed. Various alternator losses introduce a non-linear variable that is related to this ratio. A correction factor is applied to compensate for this to provide an accurate output current computation.

Block 18 applies a temperature compensation factor to the output current computed in block 17. The result is the alternator output current as a function of shaft speed as computed and corrected for temperature and alternator losses.

Block 19 further computes the power at which the alternator is operating. This is done by measuring the output voltage, comparing it to the regulated voltage setting, and then computing the percentage output voltage with respect to the desired, regulated voltage. This percentage is applied to the output current to generate the output power (the product of output voltage and current). The output power as computed above is compared to the maximum output power available at the measured shaft speed according to the output voltage and the corresponding maximum rated output current corrected for temperature.

Block 20 applies when a communication port is active to convey information from the alternator to either a monitoring or systems control module. The communication port may send and receive status, or it may send and receive commands to change a parameter being monitored. Typical status information includes output voltage, output current, shaft speed, temperature, efficiency, input power, and output power being produced as a percent of maximum rated output power at given shaft speed. An external controller can use this information to regulate shaft speed or to control applied electrical loads that affect the alternator power demand. Communication input signals can be used to change programmed limits. For example, shaft speed information can be used as part of a speed governor circuit in an auxiliary power unit that couples the alternator to a dedicated engine, and the governed speed will be dependent on the model alternator and type engine used. Programmed limits are tailored to specific alternator models. Regulated voltage setting is precisely set for each individual alternator during calibration.

The following paragraphs provide more specific details regarding the operation of the blocks 13 through 19 described above. In this discussion, the following parameters will be used:

V—measured output voltage of the regulator (Voltage Sense signal).

T—measured temperature of the regulator (Temperature Sense signal).

S—measured RPM of the alternator shaft (RPM Buffer signal).

F—measured duty cycle of the field current (Field Sense signal).

Figure 6:
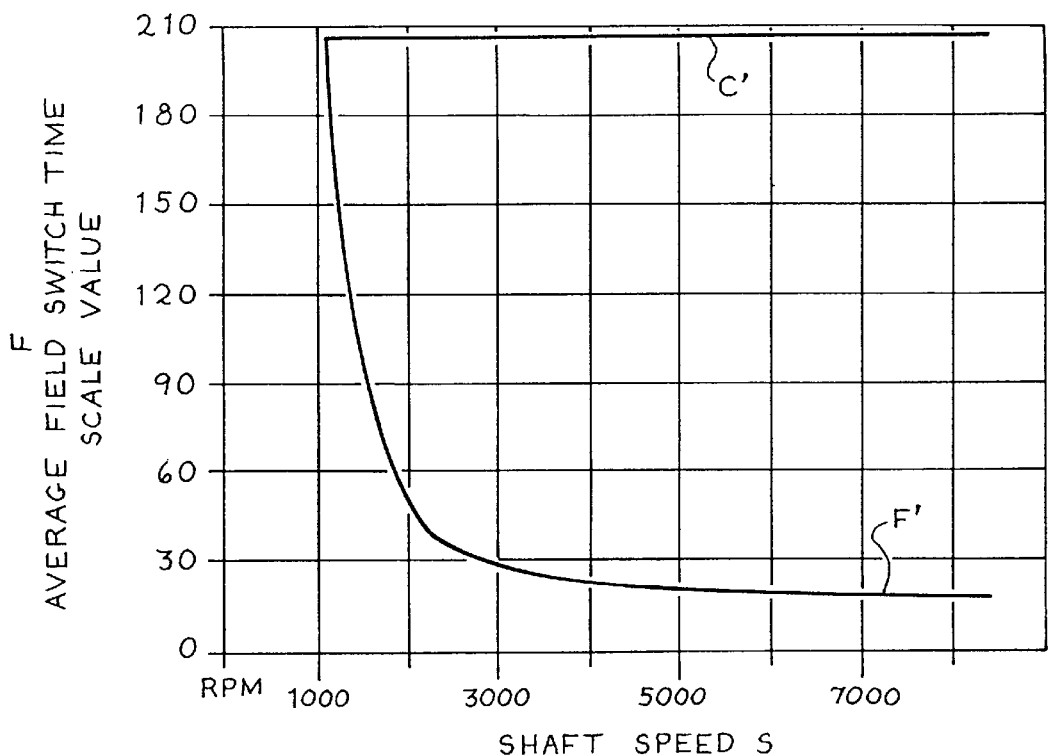
FIG. 6 is a graph illustrating one set of stored parameters suitable for use in the embodiment of FIG. 4.

In this example, the output current calculation begins with block 15, where the alternator shaft speed S is determined. Next, in block 16, a memory map is consulted using the parameter S as an index. The map provides two parameters for each stored value of S:F' and C'. F' represents the minimum field coil duty cycle that yields a measurable output current, and C' represents the maximum output current at room temperature that can be obtained at the given shaft speed, assuming a maximum duty cycle of 100%. Linear interpolation techniques are used to provide a better estimate of F' and C' than that provided by the relatively coarsely sampled map function. Simply by way of example, and without intending any limitation, FIG. 6 provides one example of a map function that has been found suitable for use in one application.

Next, Block 17 measures the actual duty cycle F and determines a related variable F % defined as follows:

$$F\% = (F-F')/(FMax-F') \cdot 100,$$

where FMax is the maximum duty cycle, 100% in this example. A correction factor between 0% and 10% is next applied to compensate for various alternator losses that are a function of F %. In one example, a correction factor of 10% is added to F % when F % is between 50% and 80%. The corrected result is F %'.

In Block 18 the temperature sense signal T is measured and used to develop a temperature compensation factor. In this example, the temperature compensation factor is determined as a linear function of temperature that varies inversely with temperature. By way of one example, where temperature correction is −10% at 100° C. and +10% at −40° C., the temperature compensation factor TF can be determined by the following formula:

$$TF=-0.143T+4.3,$$

where T is temperature in degrees Celsius. The output current C is then calculated according to the following equation:

$$C=C'*TF*F\%'.$$

The foregoing approach provides an accurate estimate of output current. During stabilized alternator operation throughout the normal operating speed range, this result is accurate to within about 2% of the actual measured output current in one example. At the edges of the normal speed range the accuracy declines to about 3% in this example.

In block 19, the output power $P_{out}$ is calculated as proportional to the product of V and C. The input power $P_{in}$ applied to the alternator shaft to achieve the calculated output power $P_{out}$ is determined by dividing $P_{out}$ by an efficiency factor E. E varies with S and can be approximated by an empirically determined linear equation. In one example, where the efficiency is 66% at 8,000 RPM and 80% at 1100 RPM, the efficiency factor E can be calculated according to the following equation:

$$E=-0.002 \cdot S+82,$$

where S is the shaft speed measured in RPM. In block 19, the input torque $T_{in}$ required to produce the output current C at the output voltage V is determined according to the following formula:

$$T_{in}=P_{in}/S \times K1,$$

where K1 is an appropriate proportionality constant.

Figure 4:
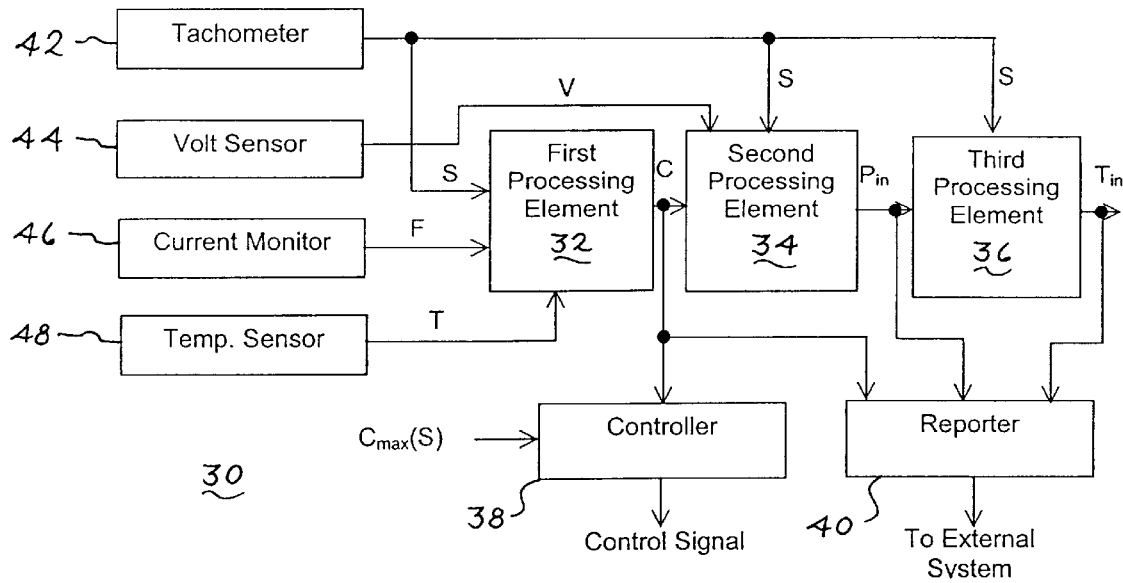
FIG. 4 is a block diagram illustrating operation of the regulator of FIG. 1.

FIG. 4 provides a block diagram illustrating one implementation of the foregoing functions. In the system 30 of FIG. 4, first, second and third processing elements 32, 34, 36 are arranged as shown. The first processing element 32 receives as inputs the parameters S, F, T described above from the tachometer 42, the current monitor 46, and the temperature sensor 48, respectively. The element 32 uses the relationships described above to generate a temperature-compensated output current C. The second processing element 34 uses the parameter C in combination with the parameters V and S to determine the input power $P_{in}$ required to generate the output current C at the voltage V, using the relationships described above. The third processing element 36 uses the input power $P_{in}$ and the speed S to generate a measure of input torque $T_{in}$.

A controller 38 responds to the determined output current C and the maximum allowable output current $C_{max}(s)$ to generate a control signal that is used for current regulation. In an alternate embodiment, the controller 38 can also respond to the calculated input power $P_{in}$ and the calculated input torque $T_{in}$ and can compare these parameters with respective limits. However, as described below in conjunction with FIG. 5, the preferred embodiment achieves the desired result of limiting both the input power $P_{in}$ and the input torque $T_{in}$ by appropriately shaping the current limitation $C_{max}(s)$.

The computed parameters C, $P_{in}$, $T_{in}$ are also applied as inputs to a reporter 40 that reports these parameters to an external system.

The processing elements 32, 34, 36 can take many forms, and are not limited to the preferred embodiment described above. For example, the processing elements 32, 34, 36 can be separate software routines performed by a computer such as the micro-controller U1 described above. Similarly, the controller 38 and the reporter 40 can also be implemented as respective routines performed by a computer. The widest variety of memory maps, digital computational techniques and analog signal processing techniques can be used to generate the parameters discussed above. Similarly, either digital or analog signal processing techniques can be used for the controller 38 and the reporter 40.

In one application, it is preferred to limit the maximum output current C, to limit the maximum input torque $T_{in}$, and to limit the maximum input power $P_{in}$. This can be accomplished by applying a maximum output current $C_{max}(s)$ that is a function of alternator RPM. Typically, the input torque applied to the alternator peaks at relatively low alternator speeds (2,000–3,000 RPM, for example). $C_{max}(s)$ is preferably set in the RPM range 500–3,300 to ensure that the input torque $T_{in}$ does not exceed a predetermined maximum value.

Conversely, input power $P_{in}$ typically peaks at high alternator speeds, (above 5,000 RPM, for example). For this reason, $C_{max}(s)$ is set for high speeds (RPM greater than 5,000) to ensure that the desired input power limit is not exceeded. The maximum current limitation $C_{max}(s)$ is used in block 19 by comparing it to the determined output current C. In the event the determined output current C exceeds the limit for the current value of S, then a flag is set that causes the regulator to reduce the field coil current (as measured by the parameter F) at the next execution of block 13. Alternately, if the output current C is less than the maximum allowed value $C_{max}(s)$, block 19 turns on a flag that allows the field coil current to be turned on at the next execution of block 13, in accordance with normal voltage regulation.

Figure 5:
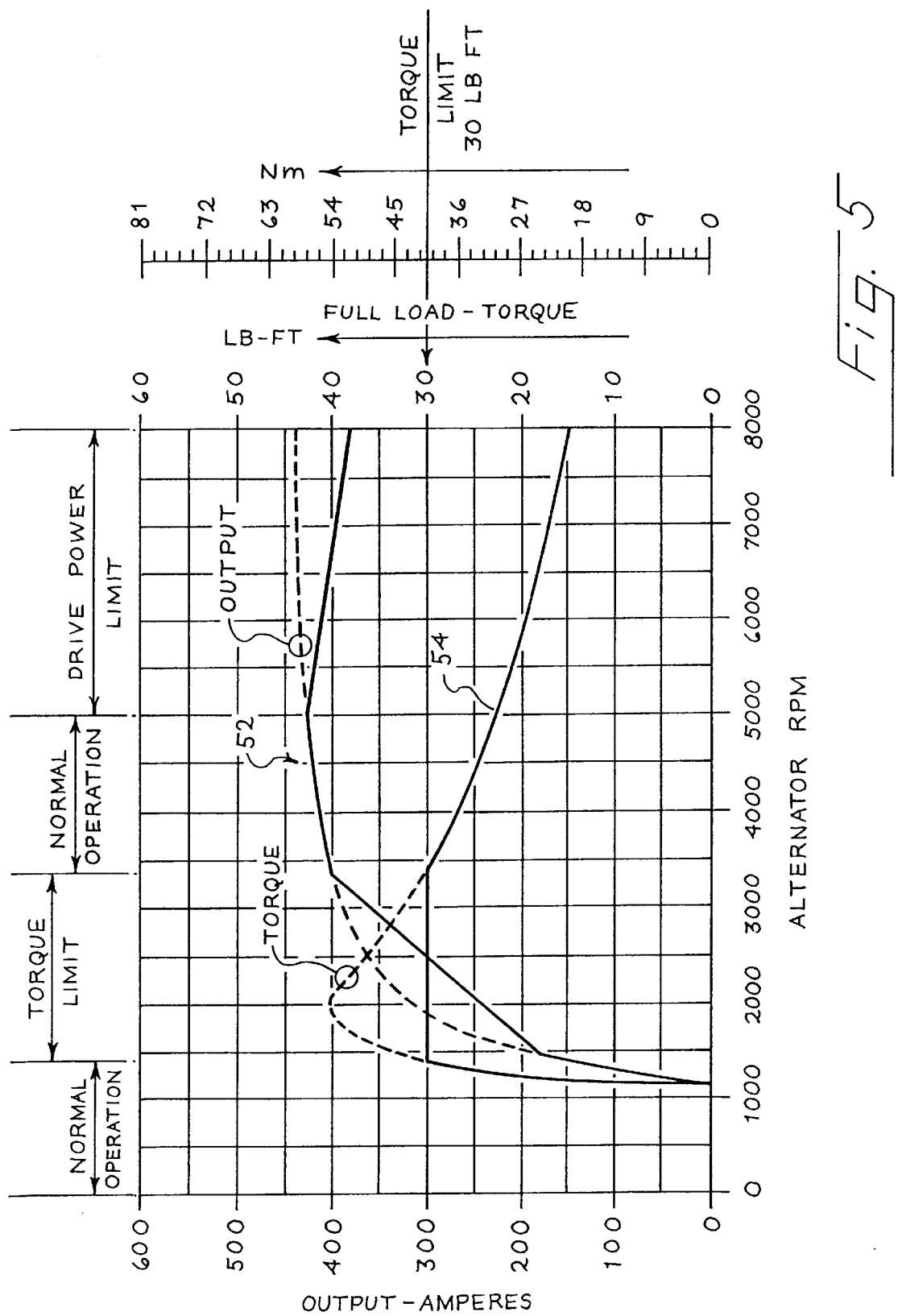
FIG. 5 is a graph illustrating one curve suitable for use as $C_{max}(s)$ in the embodiment of FIG. 4.

FIG. 5 shows one illustration of the manner in which the current limit $C_{max}(s)$ can be made to vary as a function of alternator shaft speed. In FIG. 5 the curve 52 represents $C_{max}(s)$ and the curve 54 represents the input torque required to produce the maximum output current, assuming normal voltage regulation. In both curves 52 and 54, the solid lines are used to depict the values as regulated, while the dotted lines are used to indicate the maximum current and input torque, respectively, if only the voltage were regulated and output current, input torque and input power were left unregulated. Note that the curve 52 includes four portions. The 3,300–5,000 RPM portion is of slightly rising amplitude, and is determined by current output limits imposed by the hardware of the alternator itself. The portion of the curve 52 between the speeds of 1,500 and 3,300 RPM is set at lower values to limit the input torque $T_{in}$ that the alternator applies to the drive system. The above 5,000 RPM portion of the curve 62 also falls to lower amplitudes in order to limit the input power $P_{in}$ that the alternator draws from the drive system. The segment between 1,000 and 1,500 RPM represents the normally rising output current at alternator low speed operation.

The Appendix microfiche that forms part of this application includes a computer listing and a schematic diagram for a presently preferred embodiment of this invention. This Appendix has been provided to ensure that one of ordinary skill in the art is able to make and use the best mode of this invention without undue experimentation, but is not intended to limit the scope of the claims. In the event of any inconsistency between the disclosure of the Appendix and the foregoing detailed description, it is the Appendix that is to control.

The foregoing detailed description has described only a few of the many forms that this invention can take. For example, the techniques described above can be adapted for a generator monitor that generates a signal indicative of electrical output current supplied by the alternator, without necessarily performing the regulating or the reporting functions described above. Various of the parameters described above (such as input torque and input power) may be generated directly from the basic measured parameters, without generating a measure of the output current in all cases.

Furthermore, the speed sensing circuit described above can be modified as desired, and replaced with any suitable type of tachometer. For example, various optical, electronic and magnetic tachometers (analog or digital) may be used.

Similarly, any suitable duty cycle monitor, voltage digital) may be used. Similarly, any suitable duty cycle monitor, voltage sensor and processing element can be used, including both analog and digital devices. Also, other measures of average field coil current can be used instead of field coil duty cycle.

The regulator of this invention can also store programmed limits for temperature, output power, efficiency, pursuant of rated output capacity, and shaft speed. Such variations can include controllers for controlling the alternator field current to maintain alternator operation within these program limits for one or more of these additional parameters, either alone or in combination with the parameters used to regulate field current in the preferred embodiment described above.

As used herein, the term "generator" is intended broadly to encompass the widest range of devices for generating electrical current when a generator shaft is rotated, including devices such as alternators. Thus, the term "generator" encompasses generating devices in which the one of the field coil and the winding is mounted to rotate with the generator shaft, and rotation of the shaft therefore modifies the electromagnetic interaction between the field coil and the winding. The term "generator" also encompasses devices in which both the field coil and the winding are mounted separately from the generator shaft, and the generator shaft rotates an element that modifies the electromagnetic interaction between the field coil and the winding.

As used herein, the term "function of" is intended broadly such that a first variable is said to be a function of a second variable, whether or not the first variable is also a function of one or more additional variables. For example, the output current signal is said to be a function of field coil duty cycle, even though the output current signal is also a function of shaft speed.

The foregoing detailed description has described only a few of the many forms that this invention can take. This detailed description is therefore intended only by way of illustration, and not limitation. It is only the following claims, including all equivalents, that are intended to define the scope of this invention.

What is claimed is:

1. In combination with an electrical generator comprising a field coil, a winding coupled with a pair of output terminals, and a generator shaft operative to modify electromagnetic interaction of the field coil and the winding when the shaft is rotated, a generator monitor comprising:

a tachometer, responsive to the generator and operative to generate a speed signal indicative of rotational speed of the generator shaft;

a current monitor operative to generate a field current signal indicative of average field current of the generator field coil; and a first processing element responsive to the speed and field current signals and operative to generate an output current signal indicative of electrical output current supplied by the generator via the output terminals.

2. The invention of claim 1 further comprising:

a temperature sensor operative to generate a temperature signal indicative of temperature;

wherein the first processing element is additionally responsive to the temperature signal.

3. The invention of claim 1 further comprising:

a controller, responsive to the output current signal, and operative to reduce average current of the generator field coil when the output current signal is indicative of excessive output current.

4. The invention of claim 1 further comprising:
a voltage sensor operative to generate a voltage signal indicative of voltage at one of the generator output terminals; and
a second processing element responsive to the output current and voltage signals and operative to generate an input power signal indicative of power applied to the generator.

5. The invention of claim 4 further comprising:
a controller operative to reduce average current of the generator field coil when the input power signal is indicative of excessive input power.

6. The invention of claim 4 further comprising:
a third processing element responsive to the input power signal and the speed signal to generate an input torque signal indicative of torque required to drive the generator shaft.

7. The invention of claim 6 further comprising:
a controller operative to reduce average current of the generator field coil when the input torque signal is indicative of excessive input torque.

8. A method for monitoring an electrical generator comprising a field coil, a winding coupled with a pair of output terminals, and a generator shaft operative to modify electromagnetic interaction of the field coil and the winding when the shaft is rotated, said method comprising:
(a) generating a speed signal indicative of rotational speed of the generator shaft;
(b) generating a field current signal indicative of average field current of the generator field coil; and
(c) generating an output current signal as a function of the speed signal and the field current signal, said output current signal indicative of electrical output current supplied by the generator via the output terminals.

9. The method of claim 8 further comprising:
(d) generating a temperature signal indicative of temperature; wherein act (d) generates the output current signal as a function of the temperature signal.

10. The method of claim 8 further comprising:
(d) reducing average field coil current of the generator field coil when the output current signal is indicative of excessive output current.

11. The method of claim 8 further comprising:
(d) generating a voltage signal indicative of voltage at one of the generator output terminals; and
(e) generating an input power signal as a function of the output current signal and the voltage signal, said input power signal indicative of electrical power applied to the generator shaft.

12. The method of claim 11 further comprising:
(f) reducing average field coil current of the generator field coil when the input power signal is indicative of excessive input power.

13. The method of claim 11 further comprising:
(f) generating an input torque signal in response to the input power signal and the speed signal, said input torque signal indicative of torque applied to the generator shaft.

14. The method of claim 13 further comprising:
(g) reducing average field coil current of the generator field coil when the input torque signal is indicative of excessive input torque.

15. The method of claim 8 further comprising:
(d) reporting a signal that varies as a function of the output current signal to an external system.

16. In combination with an electrical generator comprising a field coil, a winding coupled with a pair of output terminals, and a generator shaft operative to modify electromagnetic interaction of the field coil and the winding when the shaft is rotated, a generator monitor comprising:
a tachometer, responsive to the generator and operative to generate a speed signal indicative of rotational speed of the generator shaft;
a current monitor operative to generate a field current signal indicative of average field current of the generator field coil; and
a processing element responsive to the speed and field current signals to generate an input torque signal indicative of torque required to drive the input shaft; and
a controller responsive to the input torque signal and operative to reduce average current to the generator field coil when the input torque signal is indicative of excessive input torque.

17. A method for monitoring an electrical generator comprising a field coil, a winding coupled with a pair of output terminals, and a generator shaft operative to modify electromagnetic interaction of the field coil and the winding when the shaft is rotated, said method comprising:
(a) generating a speed signal indicative of rotational speed of the generator shaft;
(b) generating a field current signal indicative of average field current of the generator field coil;
(c) generating an input torque signal in response to the speed and field current signals, said input torque signal indicative of torque applied to the generator shaft; and
(d) reducing average field coil current of the generator field coil when the input torque signal is indicative of excessive input torque.

18. In combination with an electrical generator comprising a field coil, a winding coupled with a pair of output terminals, and a generator shaft operative to modify electromagnetic interaction of the field coil and the winding when the shaft is rotated, a generator monitor comprising:
a tachometer, responsive to the generator and operative to generate a speed signal indicative of rotational speed of the generator shaft;
a current monitor operative to generate a field current signal indicative of average field current of the generator field coil; and
a processing element responsive to the speed and field current signals to generate an input power signal indicative of power required to drive the input shaft; and
a controller responsive to the input power signal and operative to reduce average current to the generator field coil when the input power signal is indicative of excessive input power.

19. A method for monitoring an electrical generator comprising a field coil, a winding coupled with a pair of output terminals, and a generator shaft operative to modify electromagnetic interaction of the field coil and the winding when the shaft is rotated, said method comprising:
(a) generating a speed signal indicative of rotational speed of the generator shaft;
(b) generating a field current signal indicative of average field current of the generator field coil;
(c) generating an input power signal in response to the speed and field current signals, said input power signal indicative of power applied to the generator shaft; and
(d) reducing average field coil current of the generator field coil when the input power signal is indicative of excessive input power.

* * * * *